(12) United States Patent
Jang et al.

(10) Patent No.: US 7,869,113 B2
(45) Date of Patent: Jan. 11, 2011

(54) DISPLAY DEVICE USING ELECTROCHROMISM AND METHODS OF DRIVING THE SAME

(75) Inventors: Jaeeun Jang, Seoul (KR); Seungnam Cha, Seoul (KR); Jaeeun Jung, Seoul (KR); Yongwan Jin, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 66 days.

(21) Appl. No.: 12/453,030

(22) Filed: Apr. 28, 2009

(65) Prior Publication Data

US 2010/0110522 A1      May 6, 2010

(30) Foreign Application Priority Data

Oct. 30, 2008   (KR)  ...................... 10-2008-0107075

(51) Int. Cl.
*G02F 1/155* (2006.01)
(52) U.S. Cl. ...................................................... 359/266
(58) Field of Classification Search .................. 359/265, 359/266, 267, 268, 269, 270, 271, 272, 273, 359/274, 275, 253, 296, 452; 345/107, 105, 345/84, 85
See application file for complete search history.

(56) References Cited

U.S. PATENT DOCUMENTS

| | | | |
|---|---|---|---|
| 6,373,618 B1 * | 4/2002 | Agrawal et al. | 359/265 |
| 6,791,737 B2 * | 9/2004 | Giron | 359/265 |

FOREIGN PATENT DOCUMENTS

| | | |
|---|---|---|
| JP | 2007-225896 | 9/2007 |
| JP | 2007-322617 | 12/2007 |

* cited by examiner

*Primary Examiner*—Ricky L Mack
*Assistant Examiner*—Tuyen Q Tra
(74) *Attorney, Agent, or Firm*—Harness, Dickey & Pierce, P.L.C.

(57) ABSTRACT

Provided is a display device using electrochromism and methods of driving the same. The display device may include an electrochromic device, a plurality of first electrodes electrically connected to upper electrodes of the electrochromic device, and a plurality of second electrodes electrically connected to lower electrodes of the electrochromic device. By short-circuiting the first electrode and the second electrode, a desired pixel changes to reveal a predetermined or given color.

18 Claims, 8 Drawing Sheets

DISPLAY DEVICE USING ELECTROCHROMISM AND METHODS OF DRIVING THE SAME

CROSS REFERENCE TO RELATED APPLICATIONS

This application claims priority under U.S.C. §119 to Korean Patent Application No. 10-2008-0107075, filed on Oct. 30, 2008, in the Korean Intellectual Property Office (KIPO), the entire contents of which are incorporated herein by reference.

BACKGROUND

1. Field

Example embodiments relate to a display device using electrochromism and methods of driving the same.

2. Description of the Related Art

Due to recent display devices being more complex, an input device, e.g., a touch panel, is assembled with the display devices. However, most of the display devices detect a signal from the input device and transform the signal, thereby respectively operating driving units of the display devices. One of these display devices displays an image with a difference between a driving time of the input device and a displaying time of the display device due to the processing of the signal by the input device. For example, when a user directly writes letters on the display device, e.g., an electronic paper using a pen, the letters are shown later than the actual movement of the pen because the display device processes an input signal.

SUMMARY

Example embodiments include a display device capable of directly displaying an image through an external input signal, without requiring processing of a signal, using electrochromism, and methods of driving the same.

Additional aspects will be set forth in part in the description which follows and, in part, will be apparent from the description, or may be learned by practice of example embodiments.

According to example embodiments, a display device may include a lower substrate and an upper substrate configured to face each other with a given distance between the lower substrate and the upper substrate; a plurality of lower electrodes on a top surface of the lower substrate; a plurality of upper electrodes on a bottom surface of the upper substrate; an electrochromic layer between the lower electrodes and the upper electrodes; an electrolyte layer between the lower electrode and the upper electrode; a plurality of first electrodes on a top surface of the upper substrate, and electrically connected to the upper electrodes; and a plurality of second electrodes to cross the first electrodes on the top surface of the upper substrate, and electrically connected to the lower electrodes.

Insulating layers may be formed between the first electrodes and the second electrodes and are at positions in which the first electrodes and the second electrodes cross each other. The display device may further include a flexible substrate above the upper substrate; and a transparent electrode on a bottom surface of the flexible substrate. The display device may further include at least one spacer between the upper substrate and the transparent electrode.

The electrochromic layer may be formed on one of a bottom surface of the upper electrodes and a top surface of the lower electrodes. The electrochromic layer may include a plurality of nano particles and electrochromic material layers coated on surfaces of the nano particles. The plurality of nano particles may include $TiO_2$. The display device may further include a counter material layer between the lower electrodes and the upper electrodes, and may further include a white reflective layer between the lower electrodes and the upper electrodes.

According to example embodiments, a method of driving the display device may include applying a given voltage to the upper electrodes and the lower electrodes in order to short-circuit the first electrode and the second electrode, thereby changing a color of the display device.

The method may further include allowing the upper electrodes and the lower electrodes to enter into a floating state. The electrochromic layer may include a material that changes color by receiving electrons, and the method may further include applying a positive (+) voltage to one of the upper electrodes and the lower electrodes on which the electrochromic layer is formed. The electrochromic layer may include a material that changes color by receiving holes, and the method may further include applying a negative (−) voltage to one of the upper electrodes and the lower electrodes on which the electrochromic layer is formed.

Short-circuiting the first electrode and the second electrode may include providing a conductive material electrically connecting the first electrodes and the second electrodes. The conductive material may include a conductive pen and a hand of a user. Short-circuiting the first electrode and the second electrode may include pressing the flexible substrate, wherein the first electrode and the second electrode are electrically connected on the upper substrate via the transparent electrode formed on the bottom surface of the flexible substrate

BRIEF DESCRIPTION OF THE DRAWINGS

Example embodiments will be more clearly understood from the following detailed description taken in conjunction with the accompanying drawings.

FIG. 8 is a schematic perspective view of a display device according to example embodiments;

FIG. 9 is a cross-sectional view of the display device taken along line A-A' of FIG. 8;

FIGS. 10 through 13 are diagrams for describing a method of driving the display device of FIG. 8, according to example embodiments; and FIG. 14 is a cross-sectional view of a display device according to example embodiments.

Figure 1:
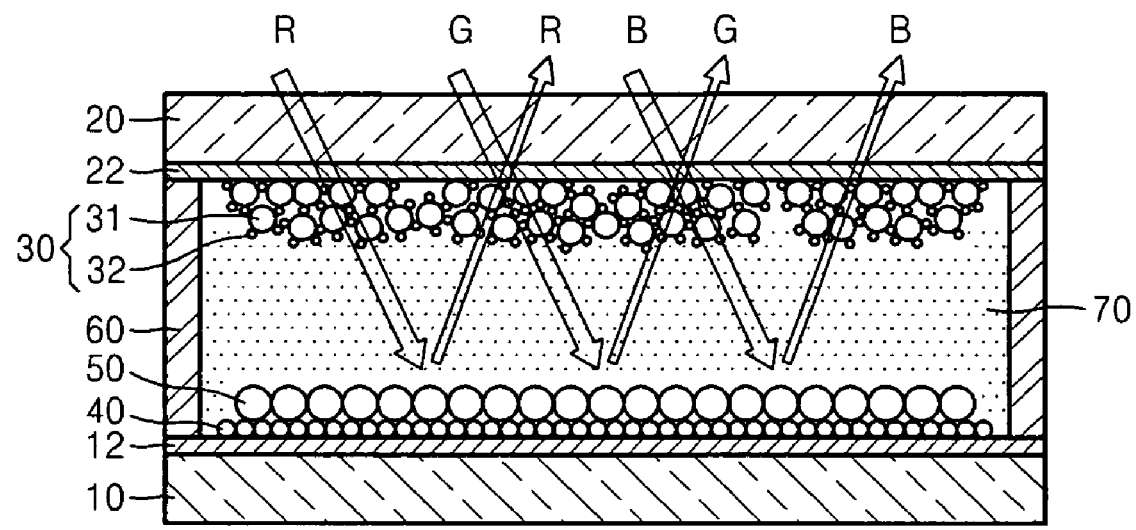
FIGS. 1 and 2 illustrate a structure and driving of a conventional electrochromic device.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Reference will now be made in detail to example embodiments, examples of which are illustrated in the accompanying drawings, wherein like reference numerals refer to the like elements throughout. In this regard, example embodiments may have different forms and should not be construed as being limited to the descriptions set forth herein. Accordingly, example embodiments are merely described below, by referring to the figures, to explain aspects of the present description. In the drawings, the sizes and relative sizes of layers and regions may be exaggerated for clarity.

It will be understood that when an element or layer is referred to as being "on," "connected to" or "coupled to" another element or layer, it may be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of example embodiments.

Spatially relative terms, e.g., "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 2:
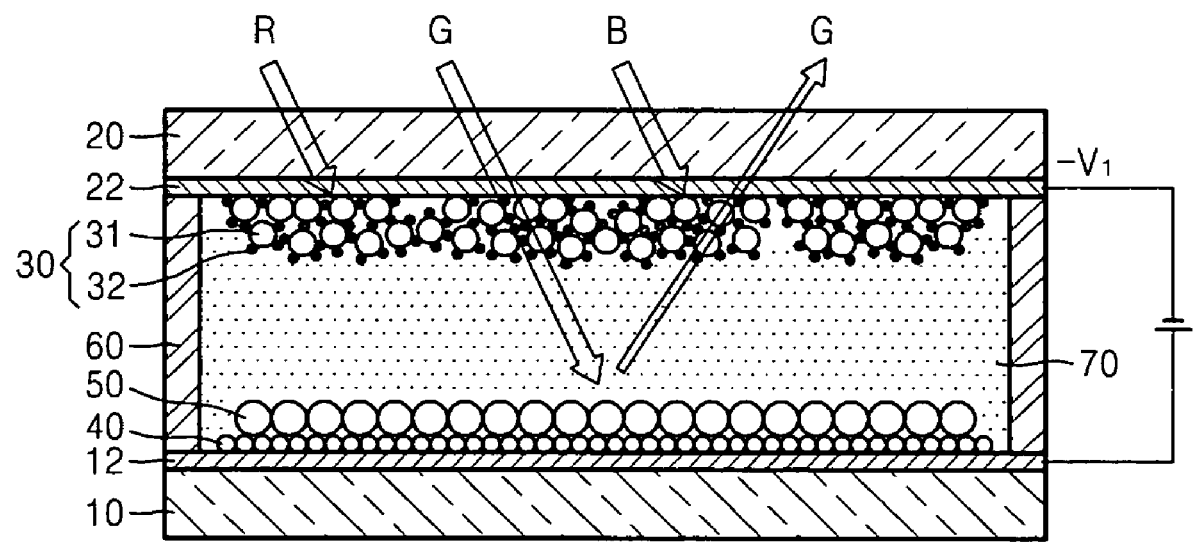

An electrochromic device is a device comprising an electrochromic material where the color changes to reveal a predetermined or given color by receiving electrons or holes. FIGS. 1 and 2 illustrate a structure and driving of a conventional electrochromic device. Referring to FIGS. 1 and 2, a lower substrate 10 and an upper substrate 20 may be disposed to face each other with a predetermined or given distance therebetween. A glass substrate may be used as the lower substrate 10 and the upper substrate 20, but example embodiments are not limited thereto.

A lower electrode 12 may be formed on a top surface of the lower substrate 10, and an upper electrode 22 may be formed on a bottom surface of the upper substrate 20. The lower electrode 12 and the upper electrode 22 may be formed of a metal or a transparent conductive material. An electrochromic layer 30 may be formed on the bottom surface of the upper electrode 22. The electrochromic layer 30 may include a plurality of nano particles 31 and electrochromic material layers 32 that are coated on surfaces of the nano particles 31. The nano particles 31 may be formed of $TiO_2$.

The electrochromic material layers 32 may exhibit electrochromism by receiving electrons or holes. For example, where the electrochromic material layers 32 are formed of a material that exhibits electrochromism by receiving electrons, when the electrochromic material layers 32 receive the electrons, the electrochromic material layers 32 may exhibit electrochromism so that the electrochromic device changes color. After that, when the electrochromic material layers 32 receive the holes, the electrochromic device may not change color.

When the electrochromic layer 30 includes the nano particles 31 and the electrochromic material layers 32 that are coated on the surfaces of the nano particles 31, the concentration of an electrochromic material may increase and a response time may be improved. Unlike in FIGS. 1 and 2, the electrochromic layer 30 may be formed by coating the electrochromic material on the bottom surface of the upper electrode 22. The electrochromic layer 30 may be formed on the top surface of the lower electrode 12, or the electrochromic material may be mixed in an electrolyte layer 70, as described below, so that the electrochromic layer 30 may be formed. The electrolyte layer 70 may be filled between the upper electrode 22 and the lower electrode 12 so that ions may move when electrochromism occurs. In example embodiments, the electrolyte layer 70 may be formed of a solvent and ionized materials that are dissolved in the solvent.

A counter material layer 40 may be formed on the top surface of the lower electrode 12. The counter material layer 40 may function to increase a charge stability in the electrochromic device, and may be formed of a material corresponding to that of the electrochromic material layers 32. For example, where the electrochromic material layers 32 are formed of a material that exhibits electrochromism by receiving the electrons, the counter material layer 40 may be formed of a material exhibiting electrochromism when receiving the holes. When the electrochromic layer 30 is formed on the top surface of the lower electrode 12, the counter material layer 40 may be formed on the bottom surface of the upper electrode 22.

The material of the counter material layer 40 may be mixed in the electrolyte layer 70 so that the counter material layer 40 may be formed. A white reflective layer 50 for reflecting light rays may be formed on the counter material layer 40. The counter material layer 40 and the white reflective layer 50 may not be necessary components of the electrochromic device, therefore, if necessary, the counter material layer 40 and the white reflective layer 50 may be omitted from the electrochromic device. In FIGS. 1 and 2, reference numeral 60 indicates a barrier wall.

Hereinafter, the driving of the electrochromic device will be described with reference to FIGS. 1 and 2. The electrochromic material layers 32 may be determined as layers formed of a material that exhibits electrochromism by receiving the electrons. First, as illustrated in FIG. 1, when a voltage is not applied to the upper electrode 22 and the lower electrode 12, the electrons may not supplied to the electrochromic material layers 32 so that electrochromism does not occur. Accordingly, external red, green, and blue light rays R, G, and B pass through the electrochromic layer 30 and may be reflected at the white reflective layer 50, thereby being emitted to the outside so that the electrochromic device does not reveal a color. As illustrated in FIG. 2, a predetermined or given voltage may be applied to the upper electrode 22 and the lower electrode 12.

When a predetermined or given negative voltage −V1 is applied to the upper electrode 22 and a zero voltage is applied to the lower electrode 12 via a power source, electrons in the electrolyte layer 70 may move to the electrochromic material layers 32 so that electrochromism occurs. From among the external red, green, and blue light rays R, G, and B, the red and blue light rays R and B may be absorbed by the electrochromic material layers 32, and only the green light ray G may pass through the electrochromic layer 30. The green light ray G that has passed through the electrochromic layer 30 may be reflected at the white reflective layer 50, thereby being emitted to the outside so that the electrochromic device reveals a green color.

FIGS. 3-7 illustrate another driving example of the conventional electrochromic device of FIGS. 1 and 2. The counter material layer 40 and the white reflective layer 50 of FIG. 1 are omitted in the electrochromic device of FIGS. 3 through 7. Electrochromic material layers 32 may be determined as layers formed of a material that exhibits electrochromism by receiving electrons.

Figure 3:
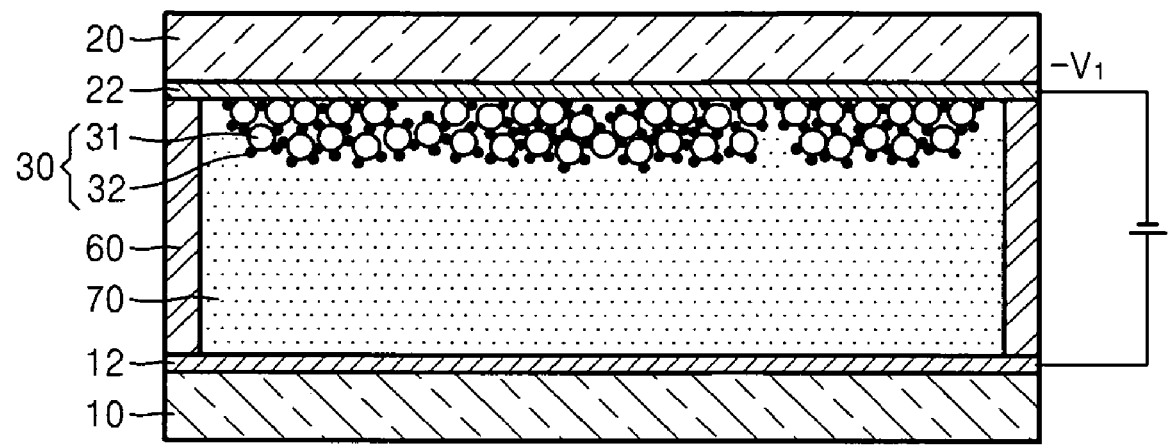
FIGS. 3 through 7 illustrate another driving example of the conventional electrochromic device.
Figure 4:
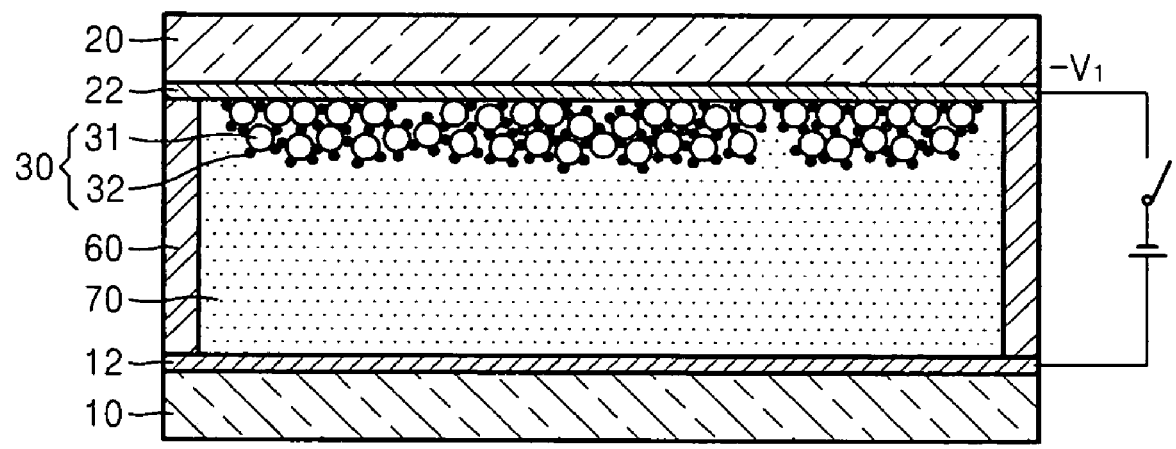

Referring to FIG. 3, as described above, when a predetermined or given negative voltage −V1 is applied to an upper electrode 22 and a zero voltage is applied to a lower electrode 12 via a power source, electrons in an electrolyte layer 70 may move to the electrochromic material layers 32 so that electrochromism occurs. Accordingly, the electrochromic device changes to reveal a predetermined or given color. Referring to FIG. 4, by cutting off power supply to the upper electrode 22 and the lower electrode 12, the upper electrode 22 and the lower electrode 12 enter into a floating state. In such a floating state, the upper electrode 22 may constantly remain at the predetermined or given negative voltage −V1 and the lower electrode 12 may constantly remain at the zero voltage so that the electrochromic device may constantly maintain its present color state as shown in FIG. 3.

Figure 5:
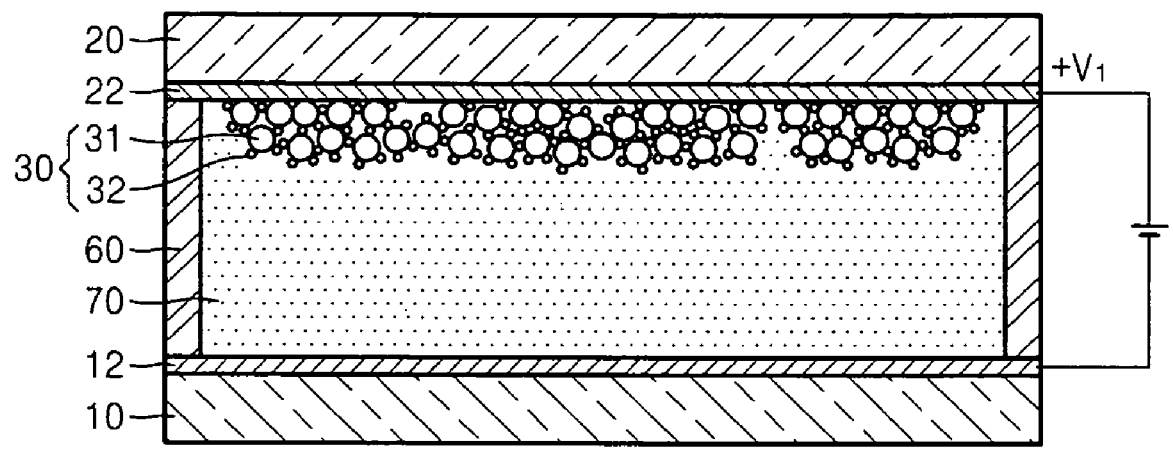
Figure 6:
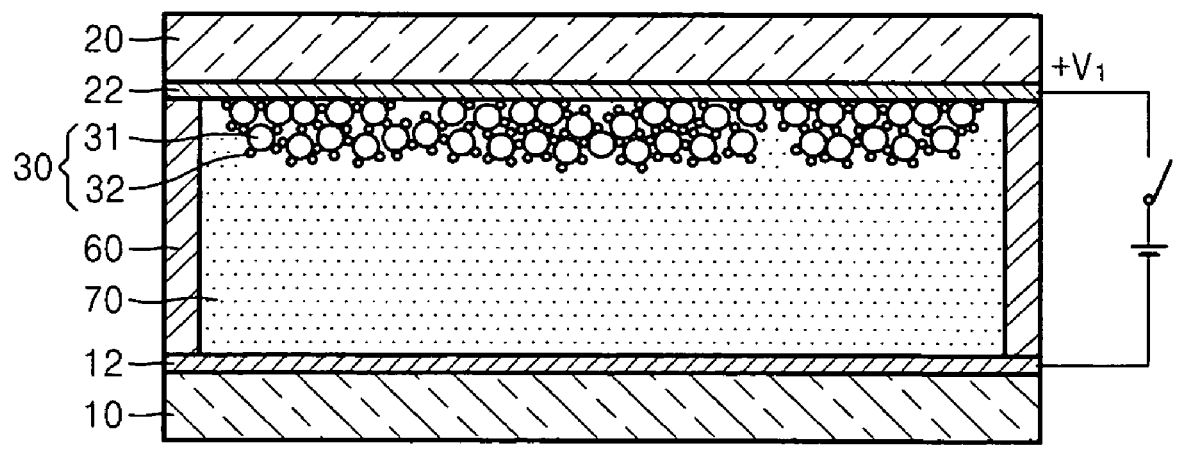

Referring to FIG. 5, when a predetermined or given positive voltage +V1 is applied to the upper electrode 22 and a zero voltage is applied to the lower electrode 12 via the power source, holes in the electrolyte layer 70 move to the electrochromic material layers 32 so that electrochromism does not occur. That is, the electrochromic device does not change color. Referring to FIG. 6, by cutting off power supply to the upper electrode 22 and the lower electrode 12, the upper electrode 22 and the lower electrode 12 enter into a floating state. In such a floating state, the upper electrode 22 may constantly remain at the predetermined or given positive voltage +V1 and the lower electrode 12 may constantly remain at the zero voltage so that the electrochromic device may constantly maintain its present color state as shown in FIG. 5.

Figure 7:
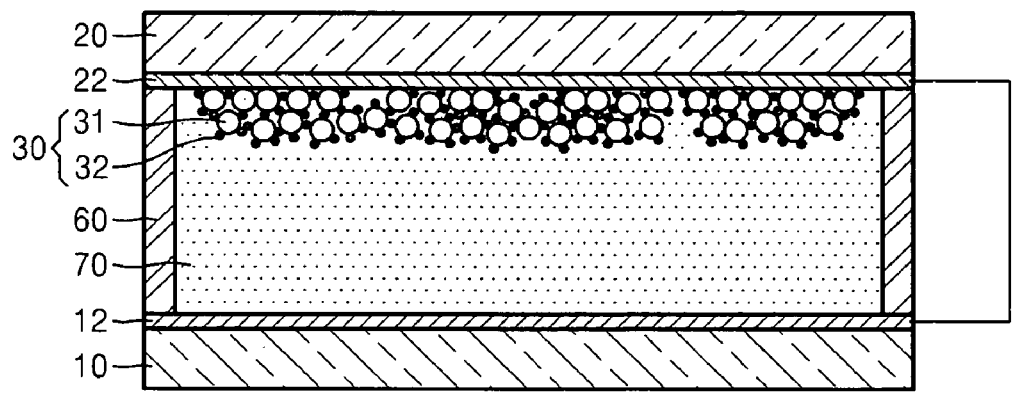

Referring to FIG. 7, when a short is made between the upper electrode 22 and the lower electrode 12, which are in the floating state, that is, when the upper electrode 22 and the lower electrode 12 are electrically connected with each other, electrons, which are accumulated in the lower electrode 12, move to the electrochromic material layers 32 so that electrochromism occurs. Accordingly, the electrochromic device changes to reveal a predetermined or given Example embodiments provide a display device that changes to reveal a predetermined or given color by applying a predetermined or given voltage to the upper electrode 22 and the lower electrode 12, and by short-circuiting the upper electrode 22 and the lower electrode 12 that are in a floating state.

Figure 8:
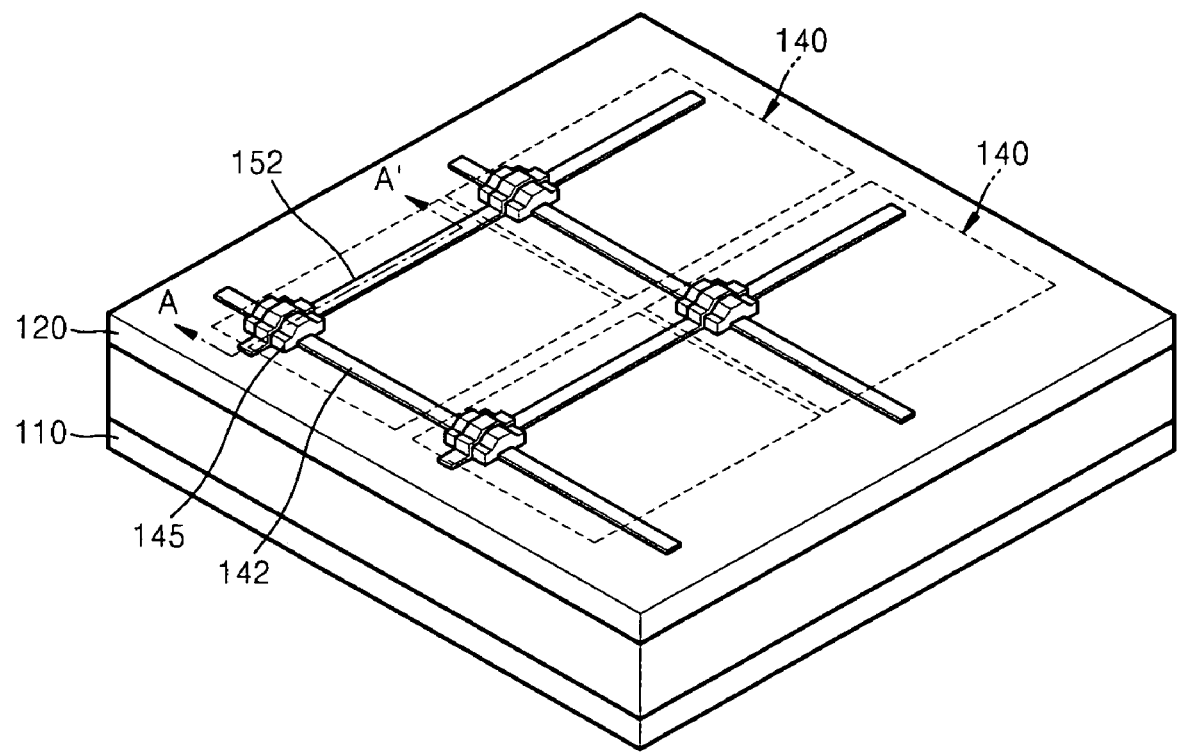
FIGS. 8-14 represent non-limiting, example embodiments as described herein.
Figure 9:
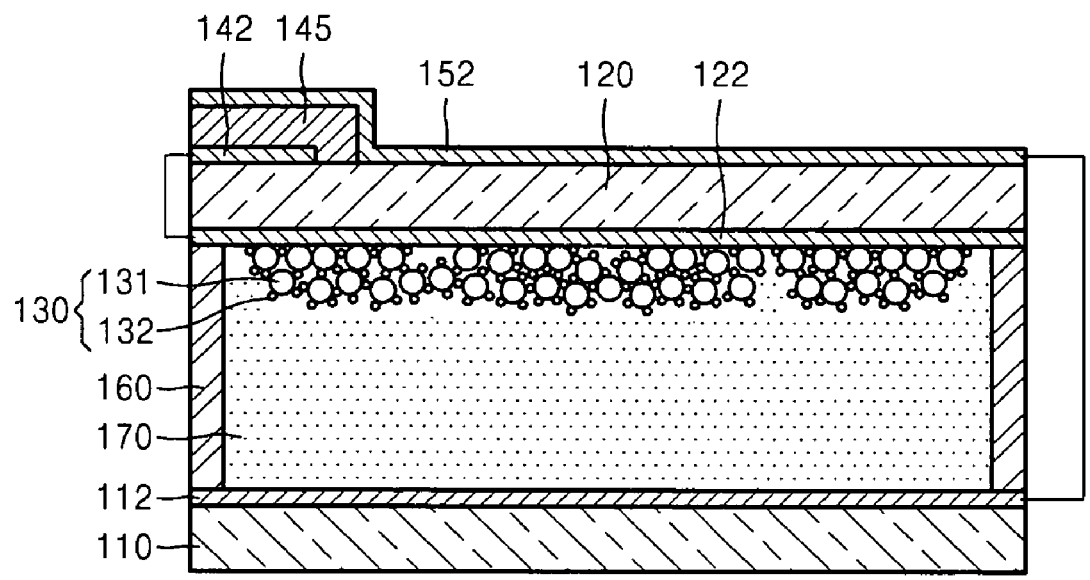

FIG. 8 is a schematic perspective view of a display device according to example embodiments. FIG. 9 is a cross-sectional view of the display device taken along line A-A' of FIG. 8. Referring to FIGS. 8 and 9, a lower substrate 110 and an upper substrate 120 may face each other with a predetermined or given distance therebetween. A glass substrate may be used as the lower substrate 110 and the upper substrate 120, but example embodiments are not limited thereto. A plurality of lower electrodes 112 may be formed on a top surface of the lower substrate 110, and a plurality of upper electrodes 122 may be formed on a bottom surface of the upper substrate 120. The lower electrodes 112 and the upper electrodes 122 may be formed of a metal or a transparent conductive material, e.g., Indium Tin Oxide (ITO). The lower electrodes 112 and the upper electrodes 122 may be formed to cross each other. However, the formation of the lower electrodes 112 and the upper electrodes 122 is not limited thereto but may vary.

An electrochromic layer 130 may be formed on a bottom surface of the upper electrodes 122. The electrochromic layer 130 may include a plurality of nano particles 131 and electrochromic material layers 132 that are coated on surfaces of the nano particles 131. The nano particles 131 may be formed of $TiO_2$. The electrochromic material layers 132 may exhibit electrochromism by receiving electrons or holes. Unlike in FIGS. 8 and 9, a predetermined or given electrochromic material may be coated on a bottom surface of the upper electrodes 122 so that the electrochromic layer 130 may be formed. The electrochromic layer 130 may be formed on a top surface of the lower electrodes 112, or a predetermined or given electrochromic material may be mixed in an electrolyte layer 170, as described below, so that the electrochromic layer 130 may be formed. The electrolyte layer 170 may be filled between the upper electrodes 122 and the lower electrodes 112 so that electrons or holes may move when the electrochromism occurs. The electrolyte layer 170 may be formed of a solvent and ionized materials that are dissolved in the solvent.

Although not illustrated in FIGS. 8 and 9, a counter material layer 40 (see FIG. 1) may be formed on the top surfaces of the lower electrodes 112. When the electrochromic layer 130 is formed on the top surfaces of the lower electrodes 112, the counter material layer 40 may be formed on the bottom surface of the upper electrode 122. Also, the material of the counter material layer 40 may be mixed in the electrolyte layer 170 so that the counter material layer 40 is formed. A white reflective layer 50 for reflecting light rays may be formed on the counter material layer 40. In FIG. 9, reference numeral 160 indicates a barrier wall.

A plurality of first electrodes 142 may be formed in a predetermined or given shape, e.g., in a stripe shape on a top surface of the upper substrate 120. The first electrodes 142 may be formed electrically connected to the upper electrodes 122. A plurality of second electrodes 152 may be formed to cross the first electrodes 142 on the top surface of the upper substrates 120. The second electrodes 152 may be formed electrically connected to the lower electrodes 112. A plurality of areas (not shown), in which the first electrodes 142 and the second electrodes 152 cross each other, respectively correspond to pixels 140. In the areas, in which the first electrodes 142 and the second electrodes 152 cross each other, insulating layers 145 may be respectively formed between the first electrodes 142 and the second electrodes 152.

Hereinafter, a method of driving the display device of FIG. 8 will be described. FIGS. 10 through 13 are diagrams for describing the method of driving the display device of FIG. 8, according to example embodiments. The electrochromic material layers 132 may be determined as layers formed of a material that exhibits electrochromism by receiving electrons.

Figure 10:
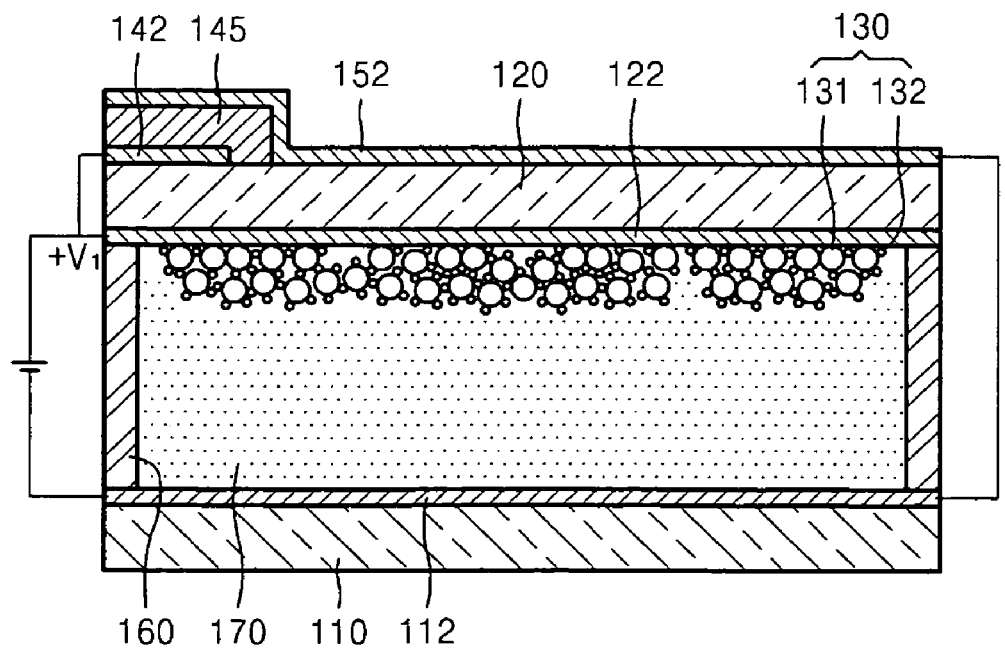

Referring to FIG. 10, a predetermined or given positive voltage +V1 may be applied to the upper electrodes 122 and a zero voltage may be applied to the lower electrodes 112 via a power source. By doing so, the predetermined or given positive voltage +V1 may be applied to the first electrodes 142 that are electrically connected to the upper electrodes 122, and the zero voltage may be applied to the second electrodes 152 that are electrically connected to the lower electrodes 112. In example embodiments, holes in the electrolyte layer 170 may move to the electrochromic material layers 132 so that electrochromism does not occur. Thus, pixels 140 do not change color.

Figure 11:
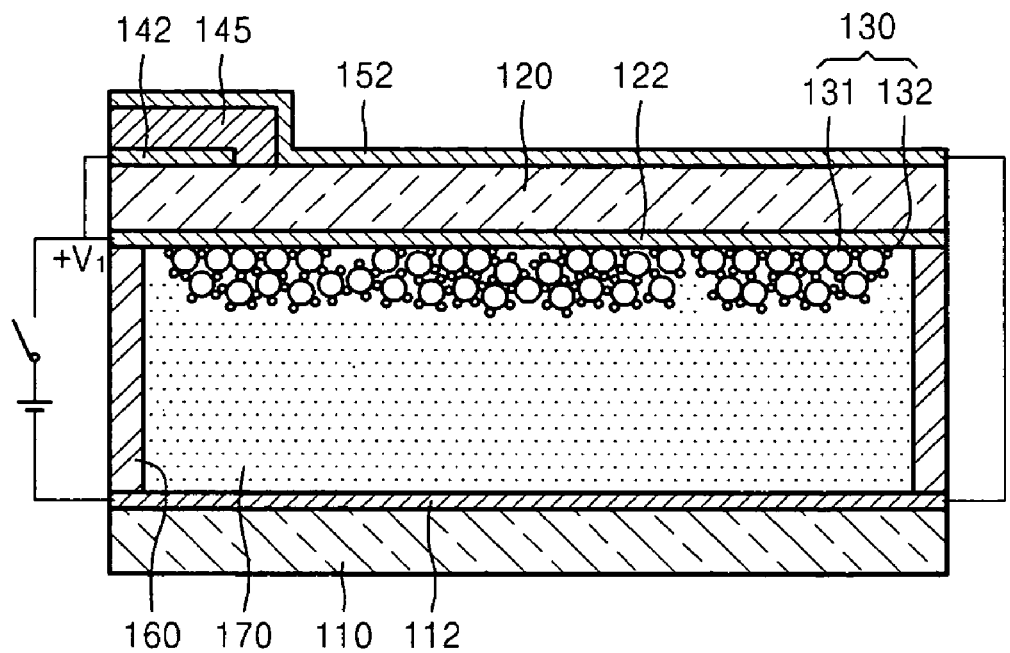

Referring to FIG. 11, by cutting off the power supply to the upper electrodes 122 and the lower electrodes 112, the upper electrodes 122 and the lower electrodes 112 enter into a floating state. In such a floating state, the upper electrodes 122 may constantly remain at the predetermined or given positive voltage +V1 and the lower electrodes 112 may constantly remain at the zero voltage so that the pixels 140 do not change color. The first electrodes 142 may constantly remain at the predetermined or given positive voltage +V1 and the second electrodes 152 may constantly remain at the zero voltage.

Figure 12:
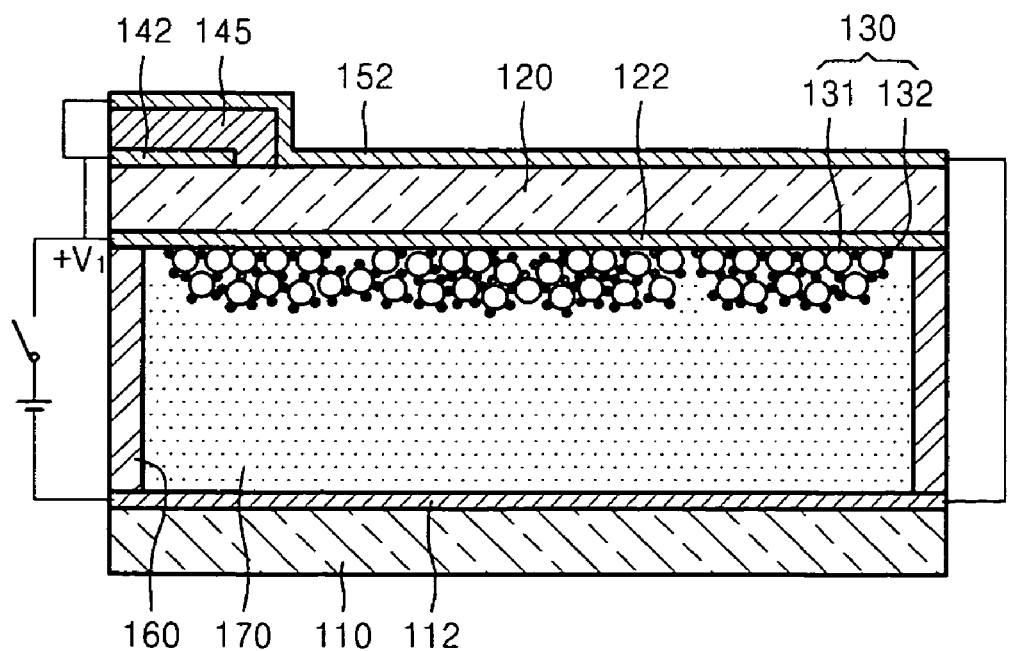
Figure 13:
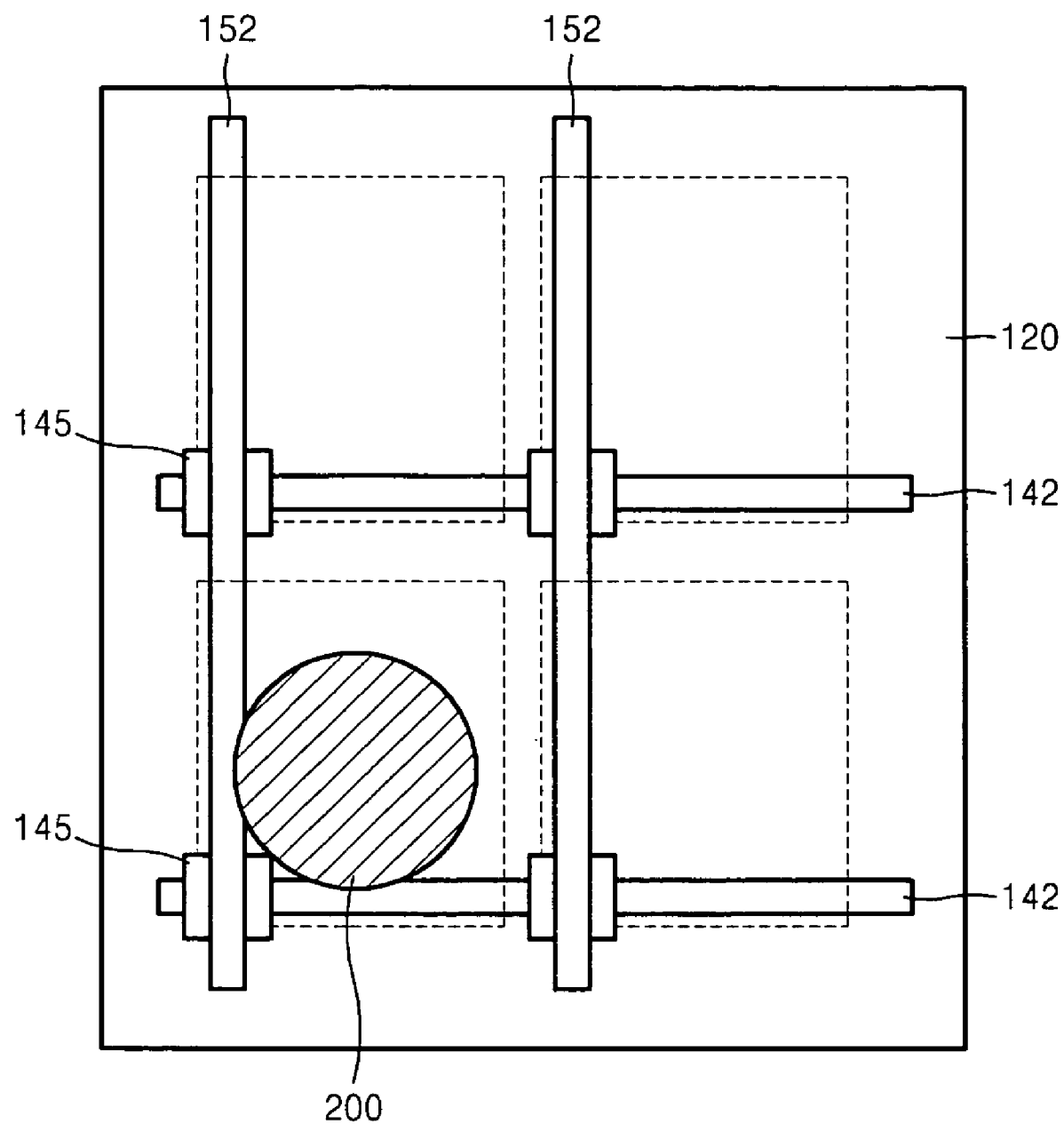

Referring to FIGS. 12 and 13, the predetermined or given first electrode 142 and the predetermined or given second electrode 152 may be short-circuited. A short between the first electrode 142 and the second electrode 152 may be achieved by electrically connecting the first electrode 142 and the second electrode 152 using a conductive material 200, as shown in FIG. 13. As the conductive material 200, a conductive pen or a body part of a human (e.g., the hand) may be used but the conductive material 200 is not limited thereto. In example embodiments, when the first electrode 142 and the second electrode 152 are short-circuited, the upper electrode 122 and the lower electrode 112 may be electrically connected with each other, wherein the upper electrode 122 and the lower electrode 112 are respectively electrically connected to the first electrode 142 and the second electrode 152. In example embodiments, when the upper electrode 122 and the lower electrode 112, which are in the floating state, are electrically connected to each other, electrons in the electrolyte layer 170 may move to the electrochromic material layers 132 so that electrochromism occurs.

Thus, the predetermined or given pixel 140, in which the first electrode 142 and the second electrode 152 cross each other, changes to reveal a predetermined or given color. As described above, in example embodiments illustrated in FIGS. 10 through 13, an external input signal may directly drive a desired pixel 140 of the display device through the conductive material 200, e.g., the conductive pen or a user's hand, thereby allowing the desired pixel 140 to change color. Thus, a signal processing process required in a conventional display device according to the related art is unnecessary so that a signal input and an image display may be simultaneously performed.

Figure 14:
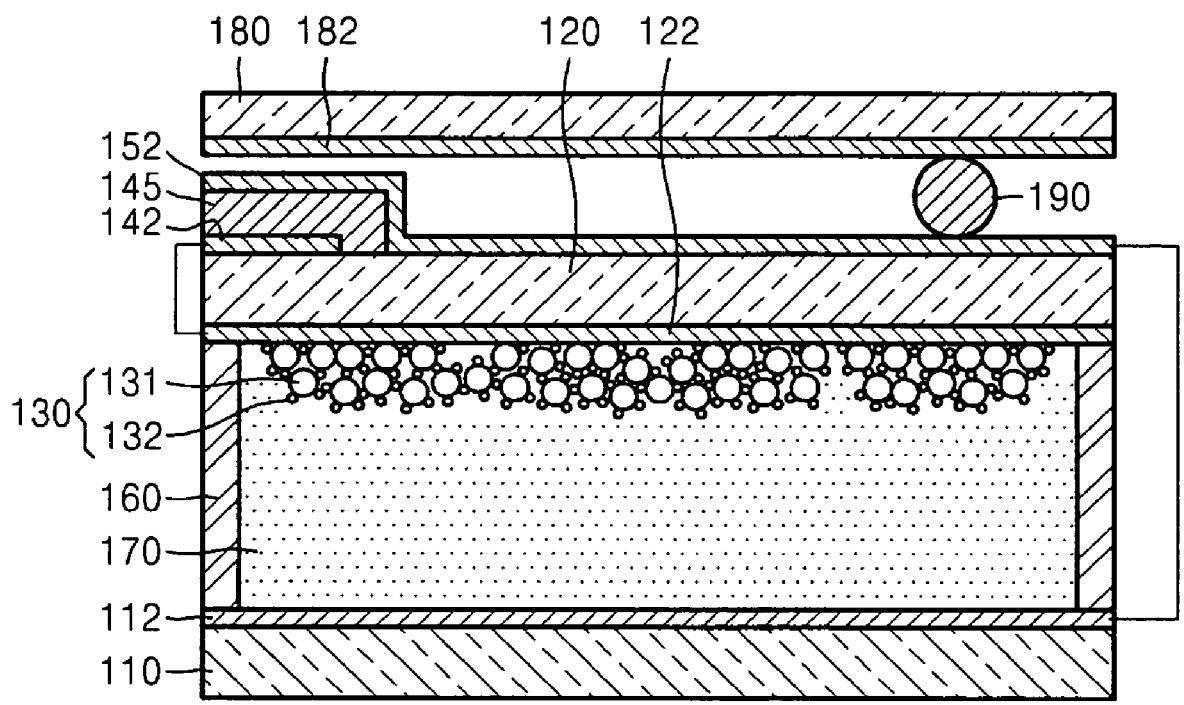

FIG. 14 is a cross-sectional view of a display device according to example embodiments. The display device of FIG. 14 has the same structure as that of the display device of FIG. 9, except that the display device of FIG. 14 has a flexible substrate 180 and a transparent electrode 182 which are formed above an upper substrate 120. Hereinafter, the display device of FIG. 14 will be described in terms of the aforementioned difference.

Referring to FIG. 14, the flexible substrate 180 may be disposed above the upper substrate 120 so as to face the upper substrate 120 with a predetermined or given distance therebetween. As the flexible substrate 180, a plastic substrate may be used but is not limited thereto. The transparent electrode 182 may be formed on a bottom surface of the flexible substrate 180. The transparent electrode 182 may be formed of a transparent conductive material, e.g., ITO, and may be formed on the entire bottom surface of the flexible substrate 180 as one body. The transparent electrode 182 may be formed to have a size corresponding to each of the pixels 140. Also, at least one spacer 190 may be arranged between the transparent electrode 182 and the upper substrate 120 so as to separate the transparent electrode 182 and the upper substrate 120 by a predetermined or given distance.

With respect to example embodiments illustrated in FIG. 14, when a user presses the flexible substrate 180 at a location corresponding to a desired pixel (refer to reference number 140 of FIG. 8) using a body part (e.g., the hand) of the user, a predetermined or given first electrode 142 and a predetermined or given second electrode 152 may be short-circuited on the upper substrate 120 due to the transparent electrode 182 formed on the bottom surface of the flexible substrate 180. Due to the short between the first electrode 142 and the second electrode 152, the desired pixel 140 of the display device may change to reveal a predetermined or given color, so that a desired image may be obtained.

The method may include the operations of short-circuiting first electrodes and second electrodes, wherein the first electrodes and the second electrodes are respectively electrically connected to an upper electrode and a lower electrode of an electrochromic device; and directly driving the display device by receiving an external input signal without performing signal processing.

It should be understood that example embodiments described therein should be considered in a descriptive sense only and not for purposes of limitation. Descriptions of features or aspects within each example embodiment should typically be considered as available for other similar features or aspects in other example embodiments.

What is claimed is:

1. A display device comprising:
   a lower substrate and an upper substrate configured to face each other with a given distance between the lower substrate and the upper substrate;
   a plurality of lower electrodes on a top surface of the lower substrate;
   a plurality of upper electrodes on a bottom surface of the upper substrate;
   an electrochromic layer between the lower electrodes and the upper electrodes;
   an electrolyte layer between the lower electrode and the upper electrode;
   a plurality of first electrodes on a top surface of the upper substrate, and electrically connected to the upper electrodes; and
   a plurality of second electrodes to cross the first electrodes on the top surface of the upper substrate, and electrically connected to the lower electrodes.

2. The display device of claim 1, further comprising:
   insulating layers between the first electrodes and the second electrodes at positions where the first electrodes and the second electrodes cross each other.

3. The display device of claim 1, further comprising:
   a flexible substrate above the upper substrate; and
   a transparent electrode on a bottom surface of the flexible substrate.

4. The display device of claim 3, further comprising:
   at least one spacer between the upper substrate and the transparent electrode.

5. A method of driving the display device of claim 3, the method comprising:
   applying a given voltage to the upper electrodes and the lower electrodes in order to short-circuit the first electrode and the second electrode, thereby changing a color of the display device.

6. The method of claim 5, further comprising:
   allowing the upper electrodes and the lower electrodes to enter into a floating state.

7. The method of claim 6, wherein short-circuiting the first electrode and the second electrode comprises:
   pressing the flexible substrate, wherein the first electrode and the second electrode are electrically connected on the upper substrate via the transparent electrode formed on the bottom surface of the flexible substrate.

8. The display device of claim 1, wherein the electrochromic layer is on one of a bottom surface of the upper electrodes and a top surface of the lower electrodes.

9. The display device of claim 5, wherein the electrochromic layer comprises a plurality of nano particles and electrochromic material layers coated on surfaces of the nano particles.

10. The display device of claim 6, wherein the plurality of nano particles comprise $TiO_2$.

11. The display device of claim 1, further comprising:
    a counter material layer between the lower electrodes and the upper electrodes.

12. The display device of claim 1, further comprising:
    a white reflective layer between the lower electrodes and the upper electrodes.

13. A method of driving the display device of claim 1, the method comprising:
    applying a given voltage to the upper electrodes and the lower electrodes in order to short-circuit the first electrode and the second electrode, thereby changing a color of the display device.

14. The method of claim 13, further comprising:
    allowing the upper electrodes and the lower electrodes to enter into a floating state.

15. The method of claim 14, wherein the electrochromic layer comprises a material that changes color by receiving electrons, further comprising:
    applying a positive (+) voltage to one of the upper electrodes and the lower electrodes on which the electrochromic layer is formed.

16. The method of claim 14, wherein the electrochromic layer comprises a material that changes color by receiving holes, further comprising:
    applying a negative (−) voltage to one of the upper electrodes and the lower electrodes on which the electrochromic layer is formed.

17. The method of claim 14, wherein short-circuiting the first electrode and the second electrode comprises:
    providing a conductive material electrically connecting the first electrodes and the second electrodes.

18. The method of claim 17, wherein the conductive material is one of a conductive pen and a hand of a user.

* * * * *